UNITED STATES PATENT OFFICE.

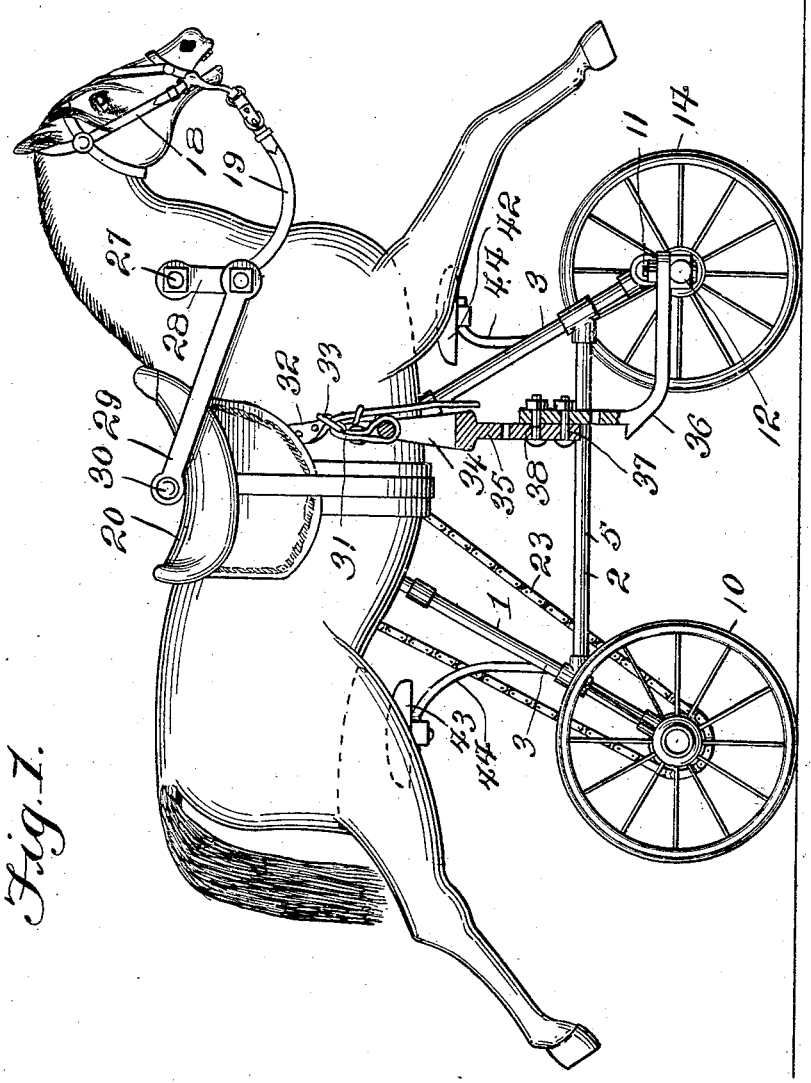

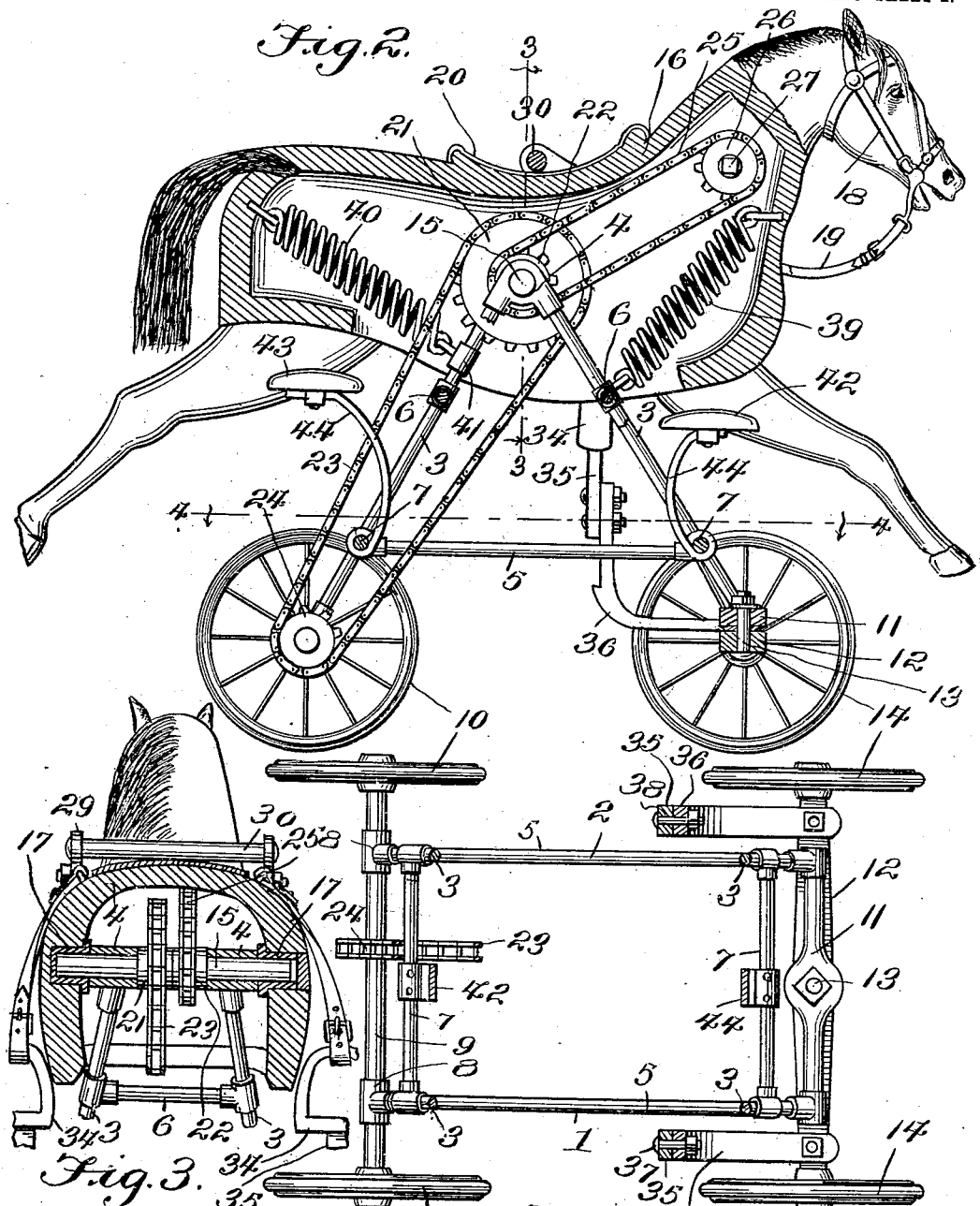

CHRISTINA E. BIRKY, OF ALVIN, ILLINOIS.

AUTO-HORSE.

941,301.  Specification of Letters Patent.  Patented Nov. 23, 1909.

Application filed April 21, 1909. Serial No. 491,302.

*To all whom it may concern:*

Be it known that I, CHRISTINA E. BIRKY, a citizen of the United States, residing at Alvin, in the county of Vermilion and State of Illinois, have invented new and useful Improvements in Auto-Horses, of which the following is a specification.

This invention relates to vehicles of the hobby-horse type provided with propelling and steering means, the object of the invention being to provide a vehicle of this character in which a horse or other animal figure is mounted for rocking movement upon a frame or carriage, and a drive gearing is provided for operating the carriage, the construction being such that the vehicle may be propelled while the occupant rocks the horse, thus giving a good imitation of the true animal motion.

A further object of the invention is to provide an auto-horse or traveling vehicle of this nature embodying an improved construction frame, propelling mechanism and guiding means, whereby it may be efficiently driven and controlled, so that it may be operated over lawns, pavements and street surfaces, as well as in rooms or halls of sufficient area.

A still further object of the invention is to provide an auto-horse or vehicle which has a smooth and easy rocking motion, and to provide a simple and efficient type of cushioning means for controlling such motion.

With these and other objects in view, the invention consists of the features of construction, combination and arrangement of parts hereinafter fully described and claimed, reference being had to the accompanying drawings, in which:—

Figure 1 is a side elevation, partly in section, of an auto-horse embodying my invention. Fig. 2 is a longitudinal section of the same, with parts in elevation. Fig. 3 is a vertical transverse section on line 3—3 of Fig. 2. Fig. 4 is a sectional plan view on the line 4—4 of Fig. 2.

In carrying my invention into practice, I provide a frame or carriage comprising two vertical side frame sections 1 and 2, each comprising a pair of divergently arranged bars or rods 3, connected at their upper ends by a V-shaped bearing and coupling member 4 and adjacent their lower ends by a longitudinal bar or rod 5. The bars 3 of the two frame sections are connected by upper transverse bars 6 and lower transverse bars 7, thus forming a frame of maximum strength and durability.

The lower extended ends of the rear rods 3 are provided with bearings 8 for a transverse rear axle 9 carrying at its opposite ends a pair of supporting and driving wheels 10. The extended lower ends of the front frame bars 3 are connected by a cross bar 11, below which is arranged a front axle 12, pivotally connected therewith by a king bolt 13. On the ends of this axle are mounted supporting and steering wheels 14.

In the coupling bearings 4 is journaled a transverse drive shaft 15, on which is pivotally mounted the horse or other animal figure 16, the body portion of which is hollowed or chambered to receive said shaft and the associated parts of the drive gearing and spring balancing means. The ends of the shaft 15 are extended beyond the bearings 4 and fit within bearing boxes 17 suitably mounted in the side walls of the chambered body of the figure, which latter is fitted with a suitable bridle 18, reins 19 and a saddle 20. The figure 16 is mounted, as shown, about midway of its length for pivotal motion in a vertical plane on the shaft 15, and is balanced as far as possible on said shaft to normally maintain a horizontal position.

Fixed to the shaft 15 is a sprocket gear 21 and a sprocket pinion 22, the former being connected by a sprocket chain 23 with a sprocket wheel 24 on the rear axle; while the latter is connected by a sprocket chain 25 with a sprocket gear 26 fixedly mounted on a transverse shaft 27 journaled in bearings in the neck or forward portion of the figure. The ends of the shaft 27 are extended beyond the sides of the figure and are provided with crank arms 28 connected with the side arms of a substantially U-shaped handle or lever 29, whose rear cross bar forms a grip, by which said lever may be manipulated by the rider to rotate the crank arms 28 and thus transmit corresponding motion to the shaft 27. Through the rotation of said shaft 27 in one direction or the other, the shaft 15 will be correspondingly rotated and transmit front or rear drive motion to the axle 9, by which the vehicle may be propelled either forward or backward.

Slings 31 are arranged at opposite sides of the figure and adjustably supported therefrom by straps 32 and connecting buckles 33, and these slings are connected with stirrups 34 adapted to receive the feet of the rider seated on the saddle 20. Each of these stirrups is connected with a steering arm or lever comprising sections 35 and 36, the former being connected to the stirrup and the latter bent downwardly and forwardly and connected with the adjacent end of the front axle 12. The meeting ends of these sections overlap and are each provided with a series of openings 37 for the passage of bolts 38, by which they are adjustably coupled together. By means of this adjustable coupling connection between the sections of the steering arms or levers, and the adjustable suspension of the stirrups from the straps 32, it will be apparent that the stirrups may be adjusted vertically to suit the length of the leg of the rider. By exerting reverse pressure upon the two stirrups it will be clear that the axle 12 may be turned in one direction or the other to steer the horse or vehicle while it is in motion.

In operation, it will be understood that the rider seated in the saddle 20 and having his feet engaged with and supported by the stirrups 34, may rock the horse and simultaneously actuate the lever 29 to operate the drive gearing, by which the vehicle may be caused to travel over the surface of the floor or ground, and that by manipulating the stirrups as described the vehicle may be readily and conveniently steered. In order to secure an easy rocking motion of the animal figure front and rear cushioning springs 39 and 40 are provided, and are diagonally arranged within the front and rear portions of the body of the figure, the front spring 39 being connected at its upper end with the front portion of the figure and at its lower end with the front upper cross bar 6, while the rear spring 40 is connected at its upper end with the rear portion of the figure and is connected at its lower end with a supplemental cross bar 41 arranged above the rear cross bar 6. These springs oppose each other in the operation of the figure and normally serve to maintain the same in a horizontal position. As the figure is rocked back and forth, the springs alternately expand and contract and limit and cushion the reverse motions. In order to further limit the motion of the figure stop devices 42 and 43 are provided and arranged respectively under the lower front and rear portions of the animal so as to be respectively engaged by reverse movements thereof. These stops are carried by curved spring supporting arms 44 fixed to the front and rear cross bars 7, so as to yield when the figure contacts therewith and then returns to normal position. It will be observed that these spring stops or cushioning devices coöperate with the springs 39 and 40 to limit the rocking motion of the figure to secure an easy movement thereof, thus preventing the transmission of shocks or jars thereto.

From the foregoing description, it will be seen that my invention provides a vehicle of the character described which is adapted to operate to closely simulte the motion of a horse or other riding animal, and that it may be propelled and guided with facility over different roads or surfaces. As the major part of the gearing is inclosed within the hollowed body of the figure, it is concealed and protected from injury and a vehicle having a presentable appearance provided.

It will of course be understood that the figure may be made of any preferred kind of material, and of different sizes for the use of both children and adults.

Having thus described the invention what is claimed as new is:—

1. A vehicle of the character described comprising a wheeled frame having driving and steering axles, an animal figure mounted to rock upon the frame, gearing for operating said driving axle, stirrups flexibly supported by the figure, arms projecting from the steering axle, and adjustable connections between said stirrups and said arms.

2. A vehicle of the character described comprising a wheeled supporting frame having driving and steering axles, a shaft upon the upper portion of the frame, an animal figure pivotally mounted to rock upon said shaft, sprocket gearing between the shaft and the driving axle, a drive shaft journaled upon the figure, sprocket gearing between said shaft and the first named shaft, cranks upon the ends of said drive shaft, and a handle connected with both cranks and extending over the figure for rocking said cranks in unison.

In testimony whereof I affix my signature in presence of two witnesses.

CHRISTINA E. BIRKY.

Witnesses:
 ELIHU BOZARTH,
 G. A. SMITH.